United States Patent [19]

Jakobsen et al.

[11] 3,929,956

[45] Dec. 30, 1975

[54] PROCESS FOR WET WINDING FILAMENTS

[75] Inventors: Karl Severin Jakobsen, Somers; Victor Joseph Nadeau, Enfield, both of Conn.

[73] Assignee: United Technologies Corporation, Hartford, Conn.

[22] Filed: Sept. 3, 1974

[21] Appl. No.: 503,002

Related U.S. Application Data

[63] Continuation of Ser. No. 302,977, Nov. 1, 1972, abandoned.

[52] U.S. Cl. .............. 264/137; 264/294; 264/325; 156/242
[51] Int. Cl.² ............................................ B29B 1/04
[58] Field of Search ................... 264/137, 294, 325

[56] References Cited
UNITED STATES PATENTS

| | | | |
|---|---|---|---|
| 2,749,266 | 6/1956 | Eldred | 264/137 |
| 2,877,498 | 3/1959 | Schneider | 264/137 |
| 3,058,165 | 10/1962 | Purvis | 264/137 |
| 3,349,157 | 10/1967 | Parson | 264/294 X |
| 3,412,062 | 11/1968 | Johnson et al. | 260/37 |
| 3,573,132 | 3/1971 | Ducloux | 264/136 X |
| 3,654,227 | 4/1972 | Dine-Hart | 264/137 X |
| 3,700,617 | 10/1972 | Glownia | 260/326 C |
| 3,734,990 | 5/1973 | Glesner | 264/137 |
| 3,881,977 | 5/1975 | Dauksys | 264/137 X |

*Primary Examiner*—Richard R. Kucia
*Attorney, Agent, or Firm*—John D. Del Ponti

[57] ABSTRACT

A method of producing a substantially voidless filament reinforced resin matrix composite comprising mixing dry uncured powder of a high temperature resin such as polyimide, polybenzimidazole, polybenzothiozole, or polyoxadiazole with a nearly saturated solvent solution of the resin to form a suspension of resin solids in the solution, applying the mixture to successive filament layers before the mixture becomes nonflowable, desolvating the mixture and compression molding.

2 Claims, No Drawings

PROCESS FOR WET WINDING FILAMENTS

BACKGROUND OF THE INVENTION

The invention herein described was made in the course of or under a contract, or under subcontract thereunder, with the Department of the Air Force.

This is a continuation of application Ser. No. 302,977, filed Nov. 1, 1972, and now abandoned.

The present invention relates to a method for producing a composite and more particularly to a method for compression molding a substantially voidless filament reinforced resin matrix composite such as that for a hoop-wound disk for a gas turbine engine.

It is known to use circumferentially wound high modulus, high strength filaments to reinforce a rotor assembly as evidenced, for example, by copending U.S. Pat. application Ser. No. 249,283 filed by Stargardter et al on May 1, 1972, now U.S. Pat. No. 3,765,796 and assigned to the same assignee as the present invention. The primary advantage of utilizing such filaments as those composed of boron, carbon, silicon carbide or silicon carbide coated boron or the like is the benefit offered by their high strength and light weight. When these filaments are provided as a circumferential winding embedded in a matrix material such as a resin or metal about a rotatable body, their high tensile strength translates into high hoop strength for carrying large centrifugal loads.

At present, one of the primary problems resides in the pressing techniques utilized to provide uniform cross-sectional distribution of the reinforcing filaments in a cured void-free resin matrix. In particular, problems have persisted where the resin matrix is a resin which has a relatively low solvent solubility, as for example the high temperature resins such as polyimide, polybenzimadazole, polybenzothiozole and polyoxadiazole since the application of a resin-solvent solution, followed by removal of the solvent, results in the occurrence of voids throughout the matrix.

Summary of the Invention

The present invention relates to a method for producing a substantially voidless filament reinforced resin matrix composite and centers on the concept of mixing dry uncured powder of a high temperature resin having a relatively low solvent solubility with a nearly saturated solvent solution of the resin to form a suspension of the resin solids in the solution, the mixture being flowable and having a high resin content.

The invention contemplates the application of the mixture, prior to its becoming nonflowable, to successive layers of filaments, preferably continuous hoop-winding layers about a base such as a gas turbine engine disk, to form a continuously matrixed laminate, exposing the laminate to heat to at least partially evaporate volatiles therefrom, e.g. the solvent, and applying uniform heat and pressure thereto, preferably in the presence of excess resin, to compression mold the desolvated laminate.

In a preferred embodiment of the invention, the composite is in the form of composite hoops circumferentially wet-wound around a circumference of a gas turbine engine disk. A predetermined quantity of dry uncured polyimide resin powder is added to a polyimide resin-solvent solution to form a suspension of resin solids therein, the mixture, being temporarily flowable and prior to becoming non-flowable, is applied to successive hoop-wound filament layers to form a continuous matrix therefor. The composite is partially desolvated by heating in air and the disk portion containing the composite hoops is then placed in a mold or die cavity and subjected to uniform heat and pressure, preferably in the presence of excess resin, to compression mold the desolvated laminate to eliminate voids.

Description of the Preferred Embodiment

Composites suitable for gas turbine engine application, such as for hoop reinforcement of a compressor disk, are preferably comprised of high modulus, high strength, low density filaments such as boron, carbon, silicon carbide, silicon carbide coated boron or the like embedded in a matrix material such as a metal, e.g. aluminum, magnesium or the like, or more preferably, a high temperature resin such as polyimide, polybenzimadazole, polybenzothiozole, polyoxadiazole or the like. Typically, the filaments are continuous and unidirectionally oriented in a circumferential manner about the axis of rotation of the disk as a result of a process wherein the filaments are wet-wound in circumferential disk slots. See for example, copending application Ser. No. 302,976 entitled, Method For Producing A Substantially Voidless Filament Reinforced Resin Matrix Composite, filed on the same date as the present application and assigned to the same assignee.

According to the present invention, one or a plurality of continuous filaments are unreeled from their supply spool and are passed through a resin bath prior to being hoop-wound in an annular layer about the disk. More preferably, however, the filaments are wound onto the disk with the resin being applied, as by flowing from a pressurized gun, on the outer surface of the windings as they are being wound in place.

The resin applied is a mixture of a dry uncured high temperature resin, such as one of those mentioned hereinbefore, with the nearly saturated solvent solution of that resin, the mixture being in the form of a suspension of resin solids in the solution. It will be appreciated, that the high temperature resins such as polyimide, polybenzimadazole, polybenzothiozole and polyoxadiazole have a relatively low solvent solubility generally below 60 percent, by weight. Polyimide, such as commercially available P13N from Ciba-Geigy, has a solubility of approximately 40 percent, by weight, with dimethylformimide. In order to increase the resin content in the winding relative to the solvent content, and so decrease the void content since solvent removal results in voids, to a suitable relatively high resin content, i.e. above 60 percent, by weight, the mixture above-described is effected. It must be emphasized that while the inventive technique does provide a flowable mixture of relatively high resin content, the mixture is only temporarily flowable and must be applied before it becomes nonflowable due to coagulation and absorption of the resin solution by the excess solids in suspension.

After application of the resin mixture to a suitable number of winding layers, the member is at least partially desolvated by exposure to heating means such as a forced air oven and then compression molded. The winding and resin mixture application followed by desolvation and compression molding may be continued sequentially until the requisite composite hoop thickness is built up.

In one investigation, four mil boron filament commercially available from Hamilton Standard Division of United Aircraft Corporation was wound about an 18 inch diameter titanium compressor disk in two circumferential slots of unequal width. A mixture was made by adding sufficient P13N dry uncured resin powder (−0.0025 inch screen size opening) to a P13N resin-dimethylformimide solvent solution (containing approximately 40 percent, by weight, resin) to form a solid suspension, the mixture having a total resin content of, by weight, approximately 64 percent. The mixture also included 5 wt. percent milled asbestos (7TF-8 from Miller Stephenson Chemical Co.) as an inert filler to aid in fiber spacing. The mixture was actually in flowable paste form and was applied to the winding layers within approximately one-half hour, after which time the viscosity became too great to allow ready flow. Each winding layer consisted of 64 or 82 filaments simultaneously wound on the disk using a 12 pound filament bundle tension with resin paste applied by gun under air pressure of 80 psi in sufficient quantity to entirely cover the preceding layer. After several winding layers and resin paste applications sufficient to increase the composite thickness by 0.112 inch, the disk was oven dried in a forced air oven for eight hours at 180°F and then compression molded. The compression mold, to properly cure the P13N resin, was heated up from room temperature to 600°F at a heat-up rate of 8.3°F per minute and held at 600°F for one hour, an initial pressure of approximately 50 psi being applied until a temperature of approximately 425°F and then a pressure of 500 psi being maintained thereafter. Additional dried, uncured P13N resin powder was used to fill the mold cavity after composite emplacement therein and acted as a pressure transfer medium. The winding, resin application, desolvating and compression molding steps were repeated four additional times. Disks fabricated according to the above procedure were substantially voidless. In one series of investigations, a disk fabricated in a five step cure procedure was successfully proof tested at the following conditions:

77°F - 10,500 rpm for 5 minutes and 11,000 rpm for 1 minute;
350°F - 10,000 rpm for 5 minutes and 11,000 rpm for 1 minute; and
600°F - 8,600 rpm for 2 hours.

Another disk, also made according to step cure procedure was subjected to a stress survey as follows:

Ambient and 350°F stress survey in 1,000 rpm increments to 10,500 rpm. Speed then raised to 11,000 rpm; and
600°F stress survey in 1,000 rpm increments to 8,600 rpm.

Results of the survey indicated that the stress determined experimentally were within 10 percent of those predicted analytically. Following this survey, the disk was subjected to low cycle fatigue (LCF) testing at cycles from idle (5,000 rpm) to sea level take-off (10,200 rpm). Testing was conducted at 350°F/40 cycles per hour to 4,000 cycles. Testing was interrupted at 2,000 and 3,000 cycles for dimensional inspection and/or visual inspection. Post-test inspections including visual, dimensional, x-ray and zyglo showed no deterioration.

What has been set forth above is intended primarily as exemplary to enable those skilled in the art in the practice of the invention and it should therefore be understood that, within the scope of the appended claims, the invention may be practiced in other ways than as specifically described.

What is claimed is:

1. A method of producing a substantially voidless filament reinforced resin matrix composite comprising:
   mixing an amount of dry uncured powder of a high temperature, relatively low solvent solubility resin selected from the group consisting of polyimide, polybenzimadazole, polybenzothiozole and polyoxadiazole with a nearly saturated solvent solution of said resin to form a suspension of resin solids in said solution, said mixture being flowable and having a total resin content, relative to the solvent content, above 60 percent, by weight;
   prior to said mixture becoming nonflowable, applying it to successive portions of high modulus, high strength filaments selected from the group consisting of boron, carbon, silicon carbide and silicon carbide coated boron to form a continuously matrixed laminate;
   at least partially desolvating said applied mixture whereby voids are created; and
   compression molding said desolvated laminate to eliminate said voids.

2. The invention of claim 1 wherein said mixture is applied to successive high modulus, high strength filament layers as they are hoop-wound around a base.

* * * * *